United States Patent [19]
Allen

[11] 3,943,760
[45] Mar. 16, 1976

[54] APPARATUS AND METHOD FOR TESTING ENGINE OIL PRESSURE

[76] Inventor: Marshall T. Allen, 4420 W. Hatcher Road, Glendale, Ariz. 85302

[22] Filed: Apr. 4, 1975

[21] Appl. No.: 565,141

[52] U.S. Cl. ............................ 73/119 R; 73/420
[51] Int. Cl.² .................. G01M 15/00; G01L 7/00
[58] Field of Search .......... 73/119 R, 118, 115, 116, 73/420

[56] References Cited
UNITED STATES PATENTS
3,869,905   3/1975   Allen ................. 73/119 R

*Primary Examiner*—Donald O. Woodiel
*Attorney, Agent, or Firm*—Herbert E. Haynes, Jr.

[57] ABSTRACT

An apparatus and method for use on an engine to selectively isolate the oil pump assembly from the engine's lubricating system for indicating which of these is producing an oil pressure problem in the engine.

9 Claims, 2 Drawing Figures

APPARATUS AND METHOD FOR TESTING ENGINE OIL PRESSURE

BACKGROUND OF THE INVENTION

1. Field of the Invention

This invention relates to test equipment and a method for testing, and more particularly to an apparatus and method for testing oil pressure in an engine.

2. Description of the Prior Art

For purposes of this disclosure, the engine's oiling system is divided into two basic portions, with the first portion being the oil pump assembly. The second portion of the engine's oiling system will hereinafter be referred to as the engine's lubricating system and includes all those parts within an engine which are normally lubricated.

It is well known in the engine art that when an oil pressure problem exists on an engine, the problem can either result from a faulty oil pump assembly or from problems within the engine's lubricating system such as worn bearings and the like. If the problem is caused by the oil pump assembly, the work required and cost of correcting the problem is relatively low when compared to the work required and cost of overhauling the engine.

For many years no method or apparatus existed, short of engine disassembly, whereby a mechanic could determine the cause of an engine's oil pressure problem so that he could give a reasonable estimate of the cost of repair.

As fully disclosed in U.S. Pat. No. 3,869,905, issued on Mar. 11, 1975, to the same inventor, such a method and apparatus has been recently devised. Briefly, that method and apparatus is designed for use on engines which employ what is commonly referred to as a spin on type of oil filter which is removed from the engine for testing purposes. An adapter plate is mounted on the exposed oil filter mounting pad and when the engine is running, the plate will block the flow of oil from the oil pump assembly to the engine's lubricating system. A pressure indicating gage is coupled to the adapter plate for sensing the output pressure of the oil pump assembly. If the output pressure of the oil pump is abnormal the mechanic will know that the engine's oil pressure problem stems from a faulty oil pump assembly. Likewise, if the oil pump output pressure is normal, the problem lies within the engine lubricating system.

Although this above described method and apparatus is a significant advance in the art, one drawback exists therein. This type of test must be conducted with the engine running and preferrably at normal operating temperature, and to block the flow of oil to the engine's lubricating system for the entire length of time needed to start the engine, conduct the test and shut the engine down could result in damage to the engine. Of course, running the engine without the benefit of oil flow and pressure for the length of time needed to bring a cold engine up to normal operating temperature is out of the question as this would undoubtedly result in serious damage.

Therefore, a need exists for a new and improved method and apparatus for testing engine oil pressure which overcomes the drawback of the prior art.

SUMMARY OF THE INVENTION

In accordance with the present invention, an improved apparatus and method is disclosed for quickly determining which portion of an engine's oil system is causing the oil pressure in that system to be low. The apparatus and method of the instant invention are intended primarily for use on engines which employ a spin on type oil filter.

The spin on oil filter is removed from the engine's oil filter mounting pad for purposes of this test and is replaced by an adapter means of the present invention. The oil supplied to the oil chamber of the mounting pad by the oil pump assembly is kept from leaking out of that chamber by the adapter means. The adapter means has a passage formed therethrough so that the oil within the mounting pad's oil chamber can pass through the adapter means to the engine lubricating system for normal pressurization thereof. The adapter means includes means for opening and closing of the oil passage formed therethrough for selectively passing or blocking the flow of oil through that passage.

When the oil is allowed to pass through the adapter means, the oil is delivered to the engine's lubricating system as is normal so that the engine can be safely started and brought up to normal operating temperature. To test the engine's oil system, the oil which normally passes through the adapter means is blocked so that the oil pump assembly is temporarily isolated from the engine's lubricating system. With the flow of oil blocked, the oil pressure within the oil chamber of the mounting pad will be the output pressure of the oil pump assembly, and that pressure is reflected on a pressure indicating means coupled to the adapter means. In other words, when the flow of oil is blocked as described above, the oil pressure present in the oil chamber of the mounting pad is the output pressure of the oil pump assembly as that pressure cannot be affected by faults which may be present in the engine's lubricating system. Therefore, if it is known that a particular engine has an oil pressure problem, and a mechanic determines, by using the apparatus and method of the present invention, that the oil pump assembly is operating at its rated capacity, he will know that the oil problem is caused by faults within the engine's lubricating system.

It may now be seen that by providing means on the adapter means for selectively passing or blocking the flow of oil, the present invention has overcome the drawback of the prior art in that normal pressurization of the engine's lubricating system need only be interrupted for a length of time needed to take a reading of the pressure indicating means.

Accordingly, it is an object of the present invention to provide a new and improved apparatus and method for testing oil pressure in an engine.

Another object of the present invention is to provide a new and improved apparatus and method for testing oil pressure in an engine to determine which portion of the engine's oil system is causing a problem in the oil pressure.

Another object of the present invention is to provide a new and improved apparatus and method for testing oil pressure in an engine of the type which employs a spin on type oil filter for determining if the oil pump assembly or the engine's lubricating system is at fault in producing an oil pressure problem.

Still another object of the present invention is to provide a new and improved apparatus and method of the above described character having means thereon for selectively and temporarily interrupting normal pressurization of the engine's lubricating system by isolating the oil pump assembly from that system so that the pump may be checked to see if it is operating at its rated capacity.

The foregoing and other objects of the present invention, as well as the invention itself, may be more fully understood from the following description when read in conjunction with the accompanying drawings.

DESCRIPTION OF THE PREFERRED EMBODIMENT

Figure 1:
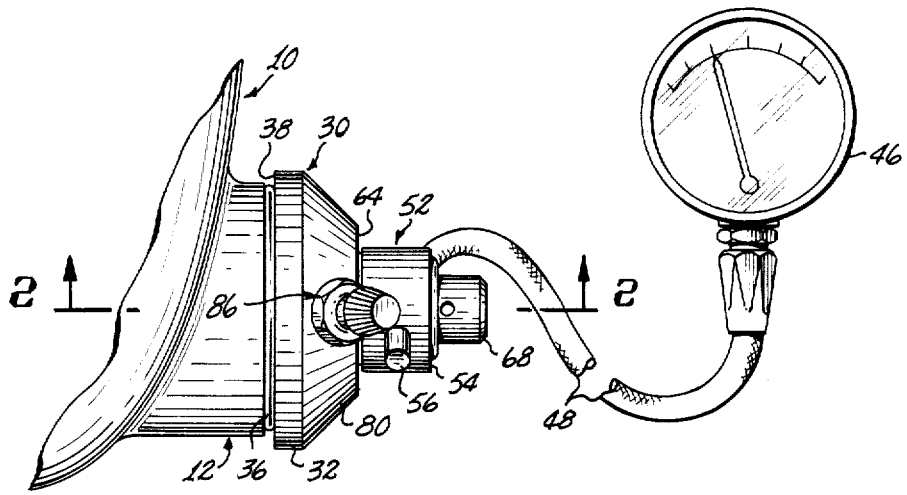
FIG. 1 is a fragmentary front elevation of an engine with the apparatus of the present invention installed on the oil filter mounting pad of the engine.

Referring more particularly to the drawings wherein there is illustrated a fragmentary portion of an engine 10 of the type which is provided with a filter mounting pad 12. The pad 12, during normal usage of the engine, has an oil filter (not shown) mounted thereon of the type sometimes referred to as a spin on filter.

The pad 12 illustrated in the drawings is typical of this type of pad; however, it should be noted that these pads will vary somewhat from one engine to the next and it is not intended that the apparatus and method of present invention be limited to usage on a specific type of filter mounting pad. As will become apparent as this description progresses, the apparatus and method of the present invention may be used on all filter mounting pads of this general type currently being used.

The filter mounting pad 12 is provided with circular lip 14 which circumscribes an oil containing chamber 16 formed therein. A hollow externally threaded stud 18 is mounted in the center of the pad 12 and extends outwardly from the chamber 16 a distance somewhat beyond the lip 14. Oil is supplied directly from the usual oil pump (not shown) through an inlet passage 22 into the chamber 16.

During normal engine usage the oil supplied to the chamber 16 will be forced under pressure into the oil filter (not shown) and will emerge from the center of the filter through the stud 18 to the engine's oil galley passage 24, which directs the oil to the engine's lubricating system (not shown).

Some engines being manufactured today are provided with a filter by-pass valve 26 mounted within a passage 28 which leads from the chamber 16 to the galley 24. This valve 26, in normal operation, will open when the oil pressure exceeds a predetermined setting of the valve and thus oil will be supplied to the engine lubricating system even though the filter may become clogged.

The oil pressure test adapter means 30 of the present invention includes a plate 32 having a centrally located aperture 34 formed therethrough. The plate 32 is fabricated so that it may be mounted on the pad 12 with one of its faces 38 in sealing juxtapositional relationship with the lip 14 and so that the stud 18 will extend in the aperture 34.

Sealing means in the form of a concentrically disposed pair of O-rings 36 is suitably mounted on the sealing face 38 of the plate 32 and are so disposed to provide an effective leakproof seal on each of the various types of mounting pads 12, the diameter of the lip 14 being one thing that varies from pad to pad.

The plate 32 is provided with a first oil passage 40 formed therein which communicates between the sealing face 38 of the plate 32 and an internally threaded bore 42, or other suitable coupling means provided on the periphery of the plate 32. By way of example of a coupling means that would be a functional equivalent, a fitting (not shown) could be welded or otherwise attached thereto.

As seen in FIG. 1, an oil pressure gage 46, or other suitable pressure indicating means is coupled such as by a conventional flex hose 48 and fittings 50 to the bore 42. The gage 46 is employed to sense the engine's oil pressure as will hereinafter be described in detail.

Figure 2:
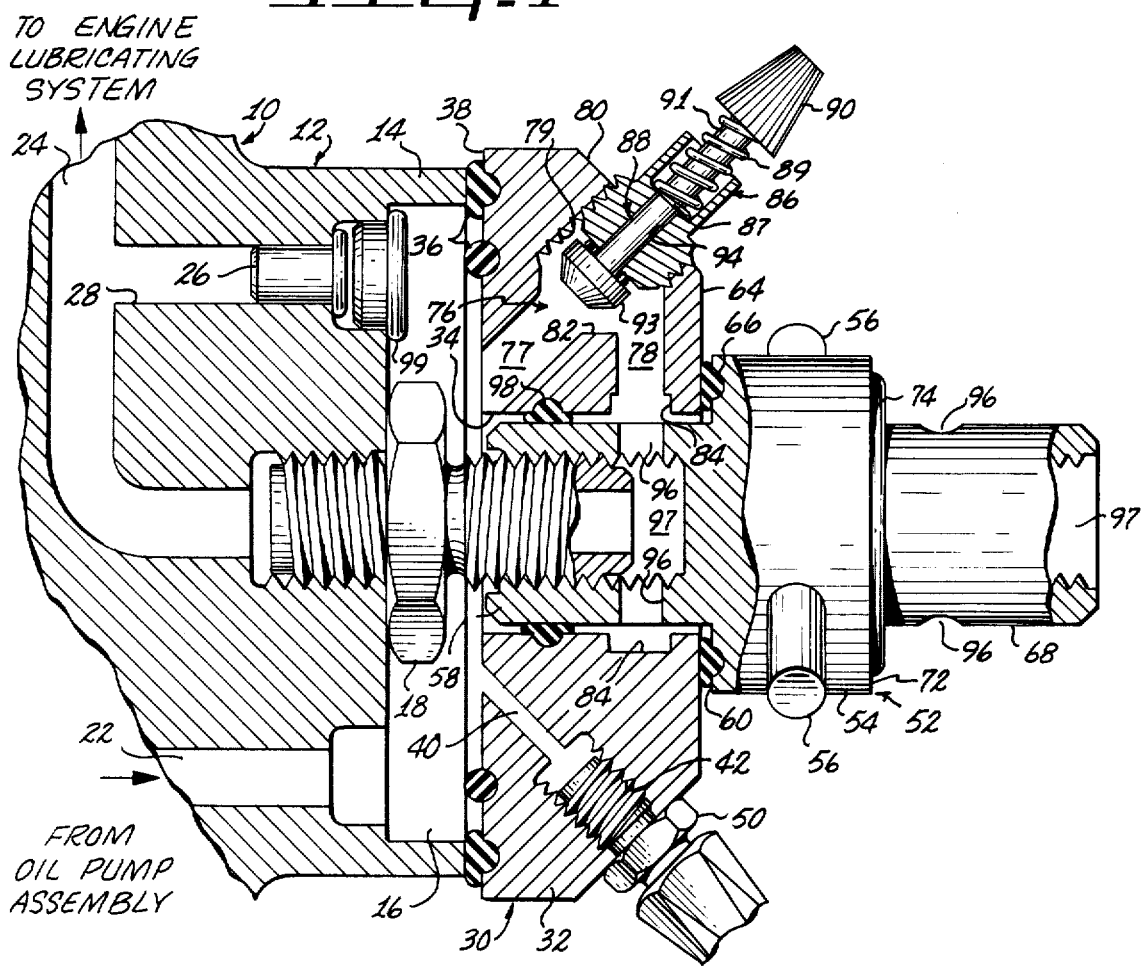
FIG. 2 is an enlarged sectional view taken on the line 2—2 of FIG. 1.

As seen best in FIG. 2, a mounting nut 52 is used to removably secure the plate 32 to the pad 12. The nut 52 has a head portion 54 preferably of cylinderical shape and has a pair of diametrically opposed radially extending pins 56 welded or otherwise secured thereto.

It should be obvious that any of several well known head configurations could be employed which would provide means by which the nut 52 can be gripped for axial rotation. For example, the head 54 could be hexagonal (not shown) so that the nut 52 could be tightened either by hand or with a suitable wrench.

The nut 52 is provided with at least one internally threaded boss 58 coaxially extending from the head 54, and of reduced diameter to form a shoulder 60 radially disposed between the periphery of the boss 58 and the periphery of the head 54.

The circumference of the boss 58 and the size of its internal threads are selected so that the boss may be inserted into the aperture 34 of the plate 32 and threadingly engage the stud 18 of the pad 12. As the nut 52 is tightened down on the stud 18, the shoulder 60 will come into contact with the face 64 of the plate 32 and move the plate into sealing engagement with the lip 14 of the pad 12. The shoulder 60 may be provided with an O-ring type sealing gasket 66, mounted thereon in any well known manner, to engage the face 64 of the plate 32 to prevent oil leakage from the aperture 34.

As hereinbefore mention, the various types of filter mounting pads 12 differ somewhat in the details of construction with one of these differences being the size of the stud 18. Therefore, so that the adapter means 30 of the present invention may be used on the various types of pads 12, the nut 52 may be provided with a second internally threaded boss 68. The second boss 68 coaxially extends from the opposite side of the head 54 of the nut 52 and is formed in the same manner as the boss 58, thus providing a shoulder 72 on which an 0-ring gasket 74 is mounted.

The only difference between the bosses 58 and 68 is the size of their respective internal threads, thus, the nut 52 is reversible to accommodate various sized studs 18 of the pads 12.

The plate 32 is provided with a passage means in the form of a second oil passage 76 which includes a first oil passage segment 77, a second oil passage segment 78 and an internally threaded bore 79. The first oil passage segment 77 extends angularly from the sealing face 38 of the plae 32 and communicates with the bore 79. The internally threaded bore 79 is enlarged with respect to the first oil passage segment 77 and opens onto the bevel surface 80 of the plate 32. The first oil passage segment 77 and the threaded bore 79 are in axial alignment with respect to each other and the transition therebetween is provided by a bevel or angularly disposed shoulder 82 which serves as a valve seat as will hereinafter be described in detail.

The second oil passage segment 78 is angularly disposed with respect to the threaded bore 79 and is in communication therewith and also with an annular groove 84 provided within the central aperture 34 of the plate 32.

A valve means 86 is threadingly mounted in the bore 79, and that valve means includes a housing 87, a slide valve 88, a spring 89, and a suitable knob 90. The slide valve 88 has a valve stem 91 on one end of which an enlarged valve head 93 is formed and on the opposite end of which the knob 90 is suitably affixed. The slide valve 88 is axially slidable in a bore 94 provided in the valve housing 87 and is biased so that the valve 88 is normally retracted, i.e., the valve head 93 is urged into engagement with the valve housing 87. The biasing is accomplished by the spring 89 which is mounted between the housing and knob. The sliding movemenet of the valve 88 is accomplished by manually depressing the knob 90 which overcomes the spring bias and axially moves the valve head 93 into sealing engagement with the valve seat or shoulder 82 formed in the second oil passage 76.

Therefore, in the normally retracted position of the valve assembly 86, the oil passage means in the form of the second oil passage 76, provided in the plate 32 will be open, and in the actuated or extended position of the valve assembly, that oil passage will be closed.

The mounting nut 52 has apertures 96 formed in each of the bosses 58 and 68 thereof so as to transversely communicate between the periphery and the internally threaded bores 97 of their respective bosses. The apertures 96 are axially disposed along their respective bosses 58 and 68 so that when the nut 52 is employed to hold the plate 32 on the mounting pad 12, the apertures 96 of the one of the bosses being employed for mounting purposes will be in alignment with the annular groove 84 in the central aperture 34 of the plate 32.

It should now be apparent that with the adapter means 30 mounted as shown and described, and with the valve means 86 in the normal position, the oil supplied to chamber 16 of the mounting pad 12 by the engine's oil pump (not shown) will pass through the oil passage means 76 in the plate 32 and will enter into bore 97 of the mounting nut 52 and then pass into the hollow stud 18 of the pad 12. Thus, oil will be delivered as described above to the engine's oil galley passage 24 and the engine will be properly lubricated as is normal so that the engine can be started and brought up to normal running temperature without endangering the engine.

Manual actuation of the valve means 86 to the extended or closed position will temporarily interrupt the flow of oil through the oil passage means 76 and the oil will be temporarity contained within the oil chamber 16 of the mounting pad 12, and that contained oil will be at pump pressure. This pressure will be sensed by the pressure indicating means 46 due to the oil pressure being transmitted thereto through the first oil passage 40 of the plate 32.

It should be noted that leakage or seeping of the oil from the oil chamber 16 during testing of the oil pressure could cause errors in the sensed pressure readings. Therefore, a seal 98 is provided in the central aperture 34 of the plate 32 to prevent oil from passing directly from the oil chamber 16 into the hollow stud 18.

In an engine of the type having no by-pass valve 26, full pump output pressure will be indicated by the gage. Thus, simply by knowing the rated output of the particular oil pump being tested, the mechanic can determine its condition. If the pump output pressure meets the requirements of the specification then the mechanic knows that the oil pressure problem of that particular engine is caused by the engine's lubricating system and can recommend an engine overhaul to his customer.

If the engine being tested is of the type which has a filter by-pass valve 26, the same analysis can be made by the mechanic. In this case, he installs a plug 99 in the oil passage 28 leading to the by-pass valve 26 to prevent oil from passing through the valve.

The method of the present invention may be easily understood after considering the steps of the method now to be described in detail.

The first step of the method of the present invention is removing of the spin on type oil filter from the engine's oil filter mounting pad 12 to expose the oil inlet passage 22, the oil chamber 16 and the oil outlet passage through the hollow stud 18.

The second step of the method of the instant invention is closing of the oil chamber 16 of the mounting pad 12 by installing the adapter means 30 thereon so that when the engine is running, the oil supplied to the oil chamber 16 by the oil pump assembly will not leak from that chamber.

The third step is accomplished by directing the oil supplied to the oil chamber 16 through the second oil passage 76 of the adapter means 30 through the mounting nut 52 into the engine's oil galley passage 24 for lubrication of the engine.

The fourth step includes interrupting the flow of oil through said adapter means temporarily by actuating the valve assembly 86 to its extended position so that the oil within the oil chamber 16 will be contained therein and will thus be at pump pressure.

The last step comprises sensing of the pressure of the oil contained within the chamber 16 during the temporarily interrupted flow thereof to determine if the engine's oil pump is running at its rated output capacity.

An additional step will be required when the engine to be tested is of the type equipped with the filter by-pass valve 26. This additional step includes plugging of the oil passage 28 leading to the filter by-pass valve 26 from the oil chamber 16 so that oil from that chamber is prevented from reaching the valve.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A method for testing oil pressure in an engine to determine if low oil pressure is being caused by a faulty oil pump assembly or by a faulty engine lubricating system, said method comprising the steps of:

a. removing the spin on oil filter from the oil filter mounting pad of the engine to expose the oil inlet passage, the oil outlet passage and the oil chamber thereof;

b. closing the oil chamber of said mounting pad with an adapter means to prevent leakage of the oil supplied thereto from the oil pump assembly when the engine is running;

c. directing the oil supplied to the oil chamber of said mounting pad through said adapter means to the oil outlet passage of said mounting pad for lubrication of the engine;

d. interrupting the flow of oil through said adapter means temporarily so that the oil in the oil chamber of said mounting pad is contained therein; and e. sensing the pressure of the oil temporarily contained within the oil chamber of said mounting pad to determine if the oil pump assembly is operating at its rated capacity.

2. A method for testing oil pressure as claimed in claim 1 comprising the additional step of plugging the filter by-pass valve, when said mounting pad is supplied with a by-pass valve to prevent oil from passing therethrough to the engine lubricating system.

3. An apparatus for determining if low oil pressure in an engine is due to a faulty oil pump assembly or due to a faulty engine lubricating system comprising in combination:

a. an engine having an oil filter mounting pad in which an oil chamber is provided for receiving oil from the oil pump of said engine and from which oil is supplied to the lubricated parts of said engine through a hollow externally threaded stud protruding from the mounting pad;

b. adapter means sealingly demountably attached to the mounting pad of said engine to prevent leakage therefrom of the oil supplied to the oil chamber thereof, said adapter means having a passage means formed therethrough for directing oil from the oil chamber of the mounting pad to the lubricated parts of said engine;

c. valve means on said adapter means and in communication with the passage means thereof, said valve means actuatable to selectively close the passage means in said adapter means to temporarily prevent the flow of oil therethrough; and d. pressure indicating means coupled to said adapter means and in communication with the oil chamber of the mounting pad of said engine for sensing the pressure of the oil supplied thereto by the oil pump assembly of said engine.

4. An apparatus as claimed in claim 3 wherein said adapter means comprises:

a. a plate having an aperture formed therethrough for receiving the stud of the mounting pad of said engine, said plate having a first oil passage formed therethrough to which said pressure indicating means is coupled and a second oil passage communicating between the sealing face of said plate and the aperture thereof to supply oil to that aperture;

b. means on the sealing face of said plate for forming a seal between said plate and the mounting pad of said engine; and c. a mounting nut within the aperture of said plate and in threaded engagement with the hollow stud of the mounting pad of said engine, said nut adapted to sealingly demountably attach said plate to the mounting pad of said engine and direct the oil supplied to the aperture of said plate into the hollow stud of the mounting pad of said engine.

5. An apparatus as claimed in claim 4 wherein said adapter means further comprises means within the aperture of said plate for preventing the direct entry of oil into the aperture from the oil chamber of the mounting pad of said engine.

6. An apparatus as claimed in claim 4 wherein said mounting nut comprises:

a. a head having means thereon by which said head may be gripped for axial rotation; and b. at least one boss integral with said head and disposed to extend axially therefrom, said boss having an internally threaded bore formed axially therein and having a circumference which is smaller than the peripheral dimension of said head to form a shoulder therebetween, said boss having at least one aperture formed therein transverse with respect to the bore and communicating between the periphery and the bore of said boss.

7. An apparatus as claimed in claim 4 wherein said adapter means further comprises a plug for use in engines of the type employing a filter by-pass valve, said plug demountably inserted within the oil passage leading from the oil chamber of the mounting pad of said engine to the by-pass valve to block the flow of oil thereto.

8. An apparatus as claimed in claim 3 wherein said valve means comprises:

a. a housing having a bore formed therethrough;

b. a slide valve mounted in the bore of said housing and axially slidable therein for movement into and out of the passage means of said adapter means for selectively closing and opening that passage means; and c. means for biasingly urging said slide valve out of the passage means of said adapter means.

9. An apparatus as claimed in claim 3 wherein said valve means comprises:

a. a housing mounted on said adapter means and having a bore formed therethrough which communicates with the passage means of said adapter means;

b. a slide valve having a valve head on one end thereof, said slide valve axially slidably movable in the bore of said housing from an extended position where the valve head thereof closes the passage means of said adapter means to a retracted position where the valve head is withdrawn for opening of the passage means of said adapter means; and c. biasing means for yieldingly urging said slide valve to the retracted position thereof.

* * * * *